United States Patent [19]
Rasidescu et al.

[11] Patent Number: 5,975,624
[45] Date of Patent: Nov. 2, 1999

[54] ALL TERRAIN VEHICLE FRAME

[75] Inventors: Mihai Rasidescu, Steinbach, Canada; Glen Arneson, Roseau, Minn.; Jeff Bennett, Roseau, Minn.; Tim Wysocki, Roseau, Minn.

[73] Assignee: Polaris Industries Inc., Minneapolis, Minn.

[21] Appl. No.: 08/630,426

[22] Filed: Apr. 3, 1996

[51] Int. Cl.[6] .................................................. B62D 21/02
[52] U.S. Cl. ................... 296/203.01; 180/311; 180/312; 280/758
[58] Field of Search .................................. 296/203–205, 296/203.01; 180/311, 312, 908; 280/781, 785, 798, 800; 29/462, 464, 469, 897.1, 897.2

[56] References Cited

U.S. PATENT DOCUMENTS

| | | | |
|---|---|---|---|
| 2,189,719 | 2/1940 | Wallace | 280/781 X |
| 3,054,636 | 9/1962 | Wessells, III | 296/204 |
| 3,613,205 | 10/1971 | Takada | 29/897.2 |
| 3,648,797 | 3/1972 | Lukens et al. | 296/203 |
| 4,726,440 | 2/1988 | Kamlukin et al. | 180/312 |
| 4,807,904 | 2/1989 | Kamlukin et al. | 180/311 |
| 5,322,208 | 6/1994 | Hinrichs et al. | 29/897.2 |
| 5,480,208 | 1/1996 | Cobes et al. | 29/897.2 |

FOREIGN PATENT DOCUMENTS

| | | | |
|---|---|---|---|
| 405039070 | 2/1993 | Japan | 180/311 |

OTHER PUBLICATIONS

Hallum, Diane L.; "Fabricator Tees Up With Golf-Car Redesign," Sep. 1994, Welding Design & Fabrication, pp. 25–27.

*Primary Examiner*—Sherman Basinger
*Attorney, Agent, or Firm*—Fredrikson & Byron, P.A.

[57] ABSTRACT

A frame for an all terrain vehicle (ATV). The frame includes a bottom frame portion which has one or more bottom plates. Each of these plates is a sheet metal stamping with precision located mounting holes stamped into it for mounting vehicle components. The plates are secured to a pair of elongated reinforcing members oriented generally horizontally and generally parallel to one another along the length of the bottom frame portion. The bottom plates are of a length and width sufficient to shield a substantial portion of an engine and/or transmission mounted to the frame. The frame also includes a top frame portion and several structural support members supporting the top frame portion with respect to the bottom frame portion. Preferably at least some of the structural support members supporting the top frame portion with respect to the bottom frame portion are sheet metal stampings. In one preferred embodiment, one of the structural support members is a portion of the ATV's transmission.

4 Claims, 17 Drawing Sheets

ALL TERRAIN VEHICLE FRAME

TECHNICAL FIELD

The invention relates to all terrain vehicles, and, in particular, to a frame and method of constructing a structural frame for all terrain vehicles.

BACKGROUND OF THE INENTION

All terrain vehicles (ATV's) are a particular genre of utility/recreational vehicle that have become quite popular in recent years. Like a snowmobile, motorcycle or personal watercraft, the ATV is relatively narrow in construction, typically having a single seat straddled by a single rider. Unlike any of these other recreational vehicles, however, the ATV has four wheels. This difference introduces some interesting engineering challenges. Like a two-wheeled motorcycle, the frame needs to be relatively narrow, since it is intended to be straddled by the rider. Unlike a motorcycle, however, the ATV has four (and sometimes six) wheels— i.e., a pair of front wheels and at least a pair of rear wheels, each member of a pair being spaced laterally from one another so that the resultant vehicle is up to four feet wide. Because the ATV is designed for off-road conditions, which can be rugged at times, the frame of the vehicle must be strong enough to withstand significant torsional stresses resulting when one of the wheels encountering uneven terrain. Such torsional stresses are generally not felt by motorcycles, since they only have one front and one rear wheel. Moreover, most other types of four-wheeled vehicles (such as golf carts, cars, etc.) can be built with fairly wide frames more easily able to handle these torsional stresses, because there is no requirement that the frames of such vehicles be sufficiently narrow to permit the rider to straddle the frame.

Typically the frame of an ATV is made from a structural metal and the various vehicle systems and components are mounted to it, including an engine, a transmission, axles and associated hubs and wheels, suspensions for the wheels, a seat, steering and electrical and mechanical control mechanisms, etc. The vehicle's structural metal frame typically is constructed from several lengths of metal tubing (square, rectangular or round), each piece of which has been bent to a particular shape and cut to a precise length so that, when assembled, the frame provides a unitary skeletal structure to which the various vehicle systems and components may be mounted.

To provide points of attachment on the frame for mounting the various vehicle systems and components, brackets usually are welded to the tubular frame, the brackets having mounting holes in locations corresponding to the desired mounting positions for the various components. Due to the need for structural integrity and proper mounting of the various vehicle components to be mounted on the frame, it is not unusual for the complete frame skeleton to have over 100 parts. That is, fabrication of the frame itself (excluding all of the vehicle systems and components mounted to the frame) can require the assembly of well over 100 separate tubes and brackets.

Proper spatial alignment of many of the vehicle components must be attained to assure that the completed vehicle has the proper fit and finish. Also, certain of the vehicle components must be accurately spaced with respect to one another to provide proper alignment and operation of those components. To achieve this proper spacing and alignment, the scores of tubes and brackets must be assembled with great precision. For example, the relative mounting positions of the engine and the transmission are important for proper drive train performance. Similarly, proper geometry must be attained between the transmission and the suspension of the drive wheels. To provide the proper spatial relationships for all these mounting points, each frame for each vehicle must be constructed with a high level of accuracy and consistency—the structural tubes must consistently be cut to the proper length, bent to the proper shape, and welded together in the proper spatial configuration. The dozens of brackets secured to the structural tubes must be consistently welded to precisely the proper location and at the proper orientation to ensure that the components mounted to these brackets will have the proper spacing and orientation. Most of the welding and other assembly of the frame and brackets are done manually, making the construction and quality control of the entire frame labor intensive.

SUMMARY OF THE INVENTION

The invention provides an ATV having a frame that is easily, relatively quickly and economically constructed in a highly consistent fashion, within relatively strict tolerances. The frame, including the necessary brackets for mounting vehicle systems and components, has substantially fewer parts than the prior art frames referred to above, and includes precision located mounting holes for precisely locating attachment points for vehicle systems and components, including, e.g., the engine, transmission, and suspension components. Surprisingly, the frame has very good structural strength, and is able to withstand significant torsional stresses resulting from any one of the four (or more) wheels encountering uneven terrain.

The frame includes a bottom frame portion which has one or more bottom plates. Each of these plates is a sheet metal stamping with precision located mounting holes stamped into it for mounting vehicle components. In a preferred embodiment, the bottom frame portion includes two or more bottom plates precision aligned with respect to one another and secured to a pair of elongated reinforcing members oriented generally horizontally and generally parallel to one another along the length of the bottom frame portion. The bottom plates preferably are of a length and width sufficient to shield a substantial portion of an engine and/or transmission mounted to the frame.

The frame also includes a top frame portion, sufficiently narrow to be straddled by a rider, and several structural support members supporting the top frame portion with respect to the bottom frame portion. Preferably at least some of the structural support members supporting the top frame portion with respect to the bottom frame portion are sheet metal stampings. In one preferred embodiment, one of the structural support members is a portion of the ATV's transmission.

DETAILED DESCRIPTION OF THE INVENTION

Figure 1:
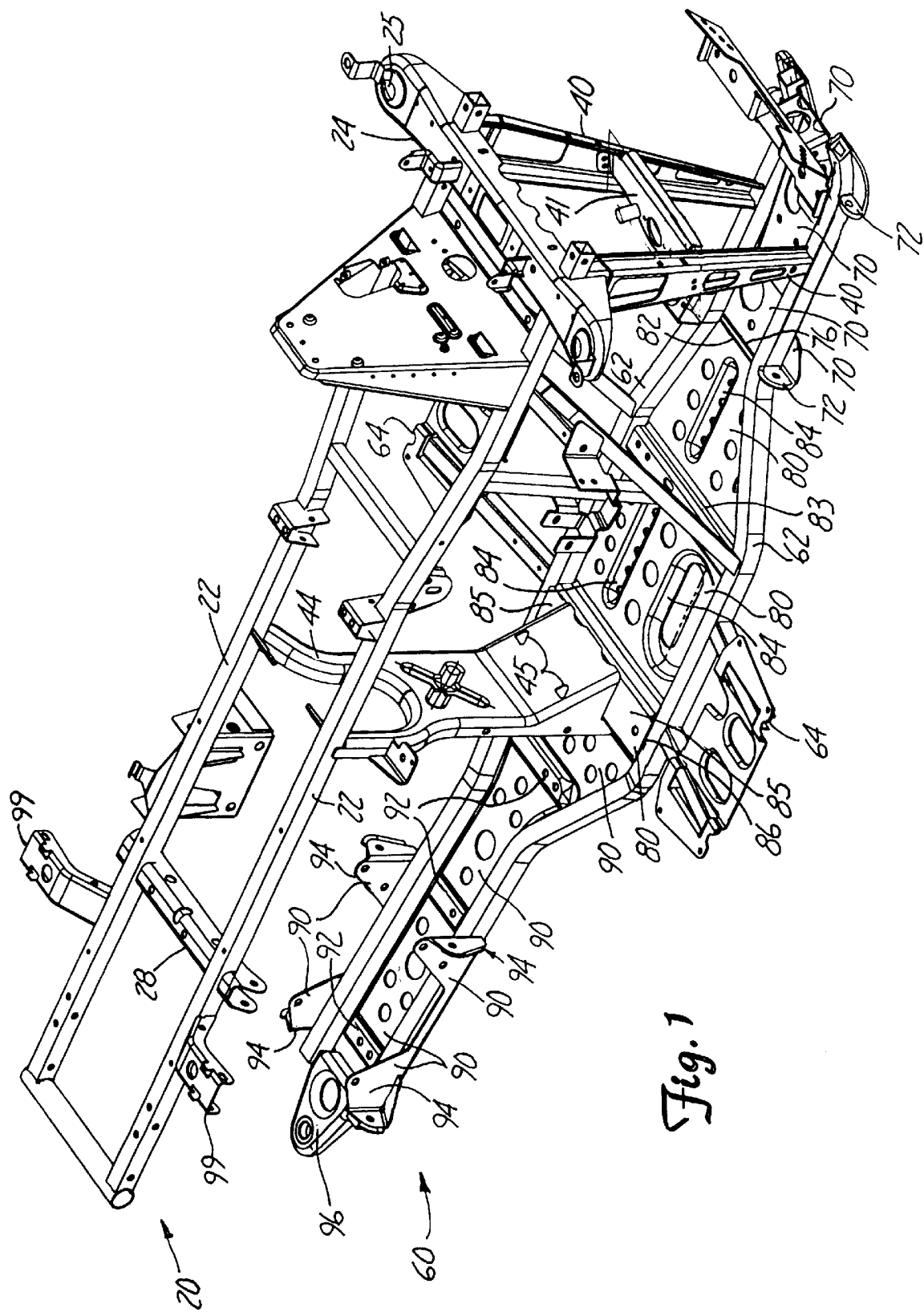
FIG. 1 is a front, top, right side perspective view of an all terrain vehicle frame of the invention.
Figure 2:
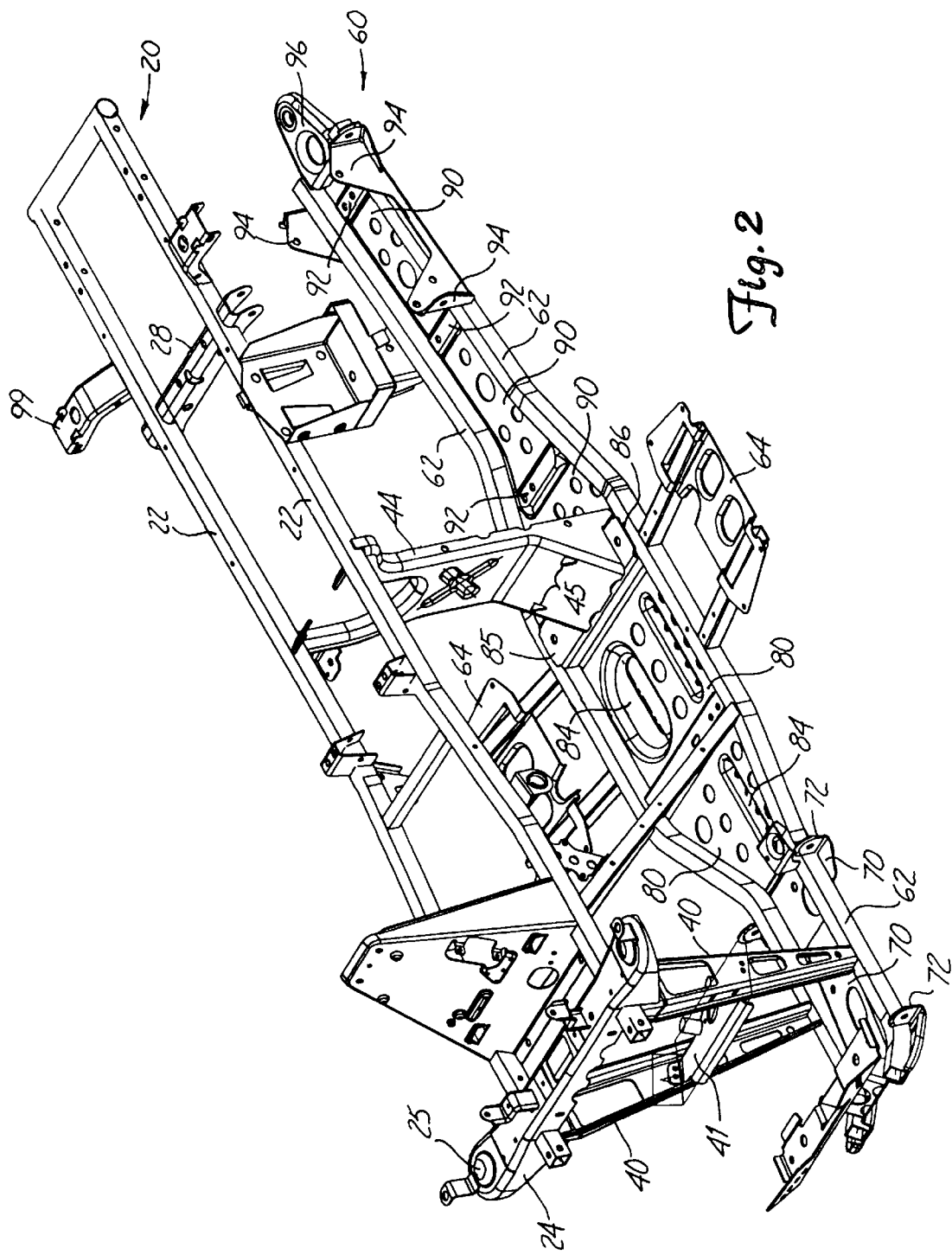
FIG. 2 is a front, top, left side perspective view of the all terrain vehicle frame shown in FIG. 1.
Figure 3:
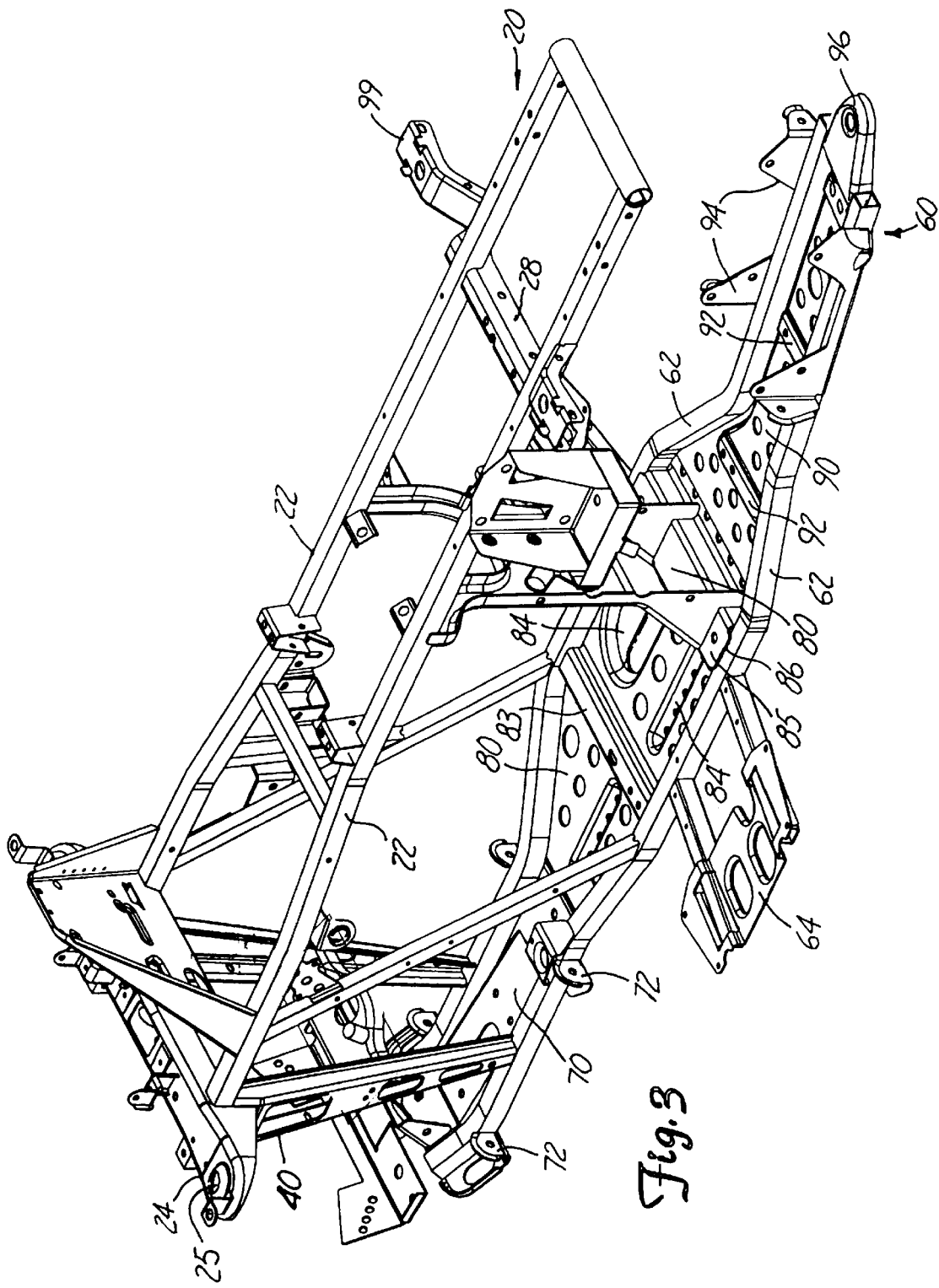
FIG. 3 is a rear, top, left side perspective view of the all terrain vehicle frame shown in FIG. 1.
Figure 4:
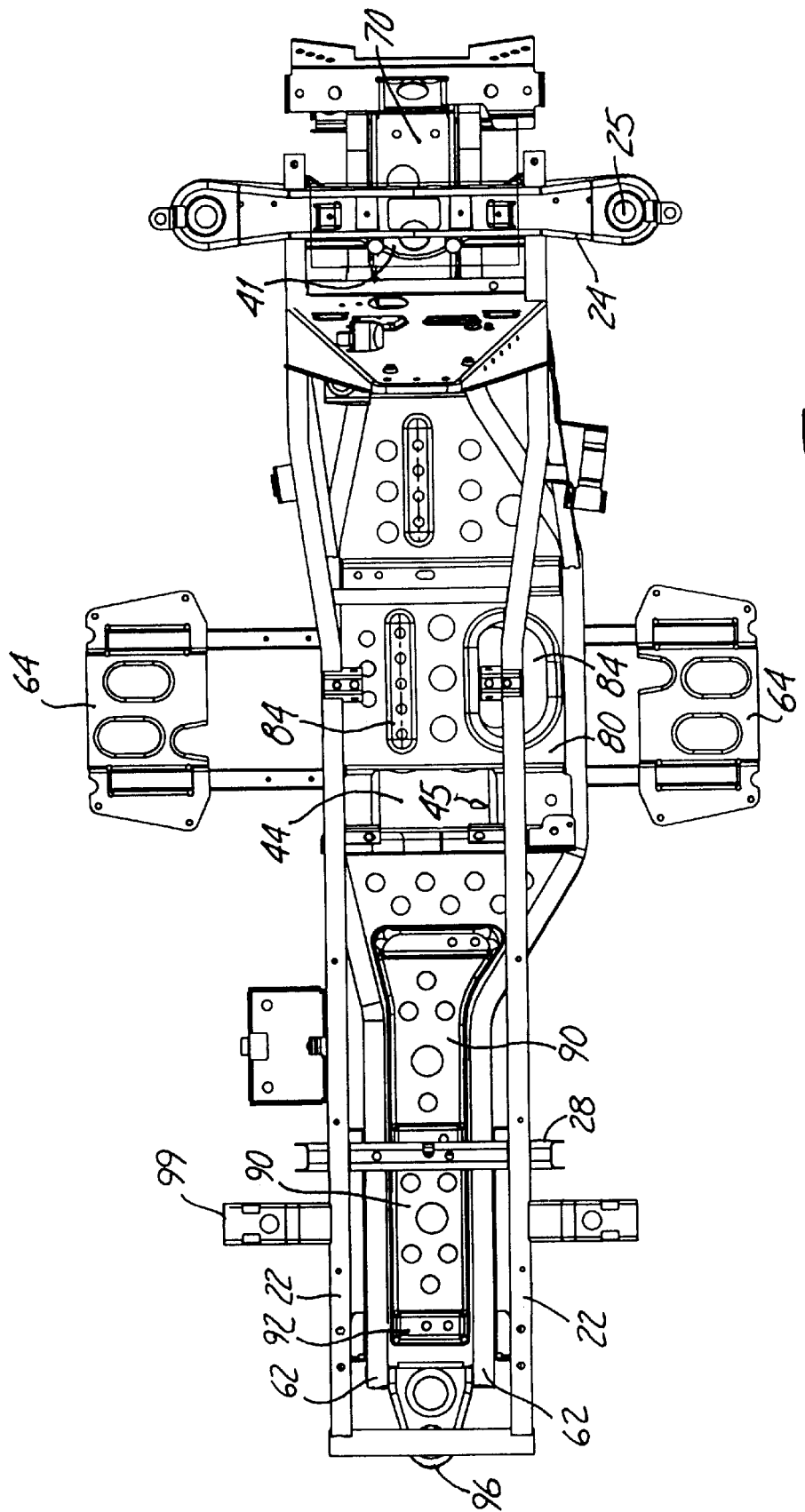
FIG. 4 is a top plan view of the all terrain vehicle frame of FIG. 1.
Figure 5:
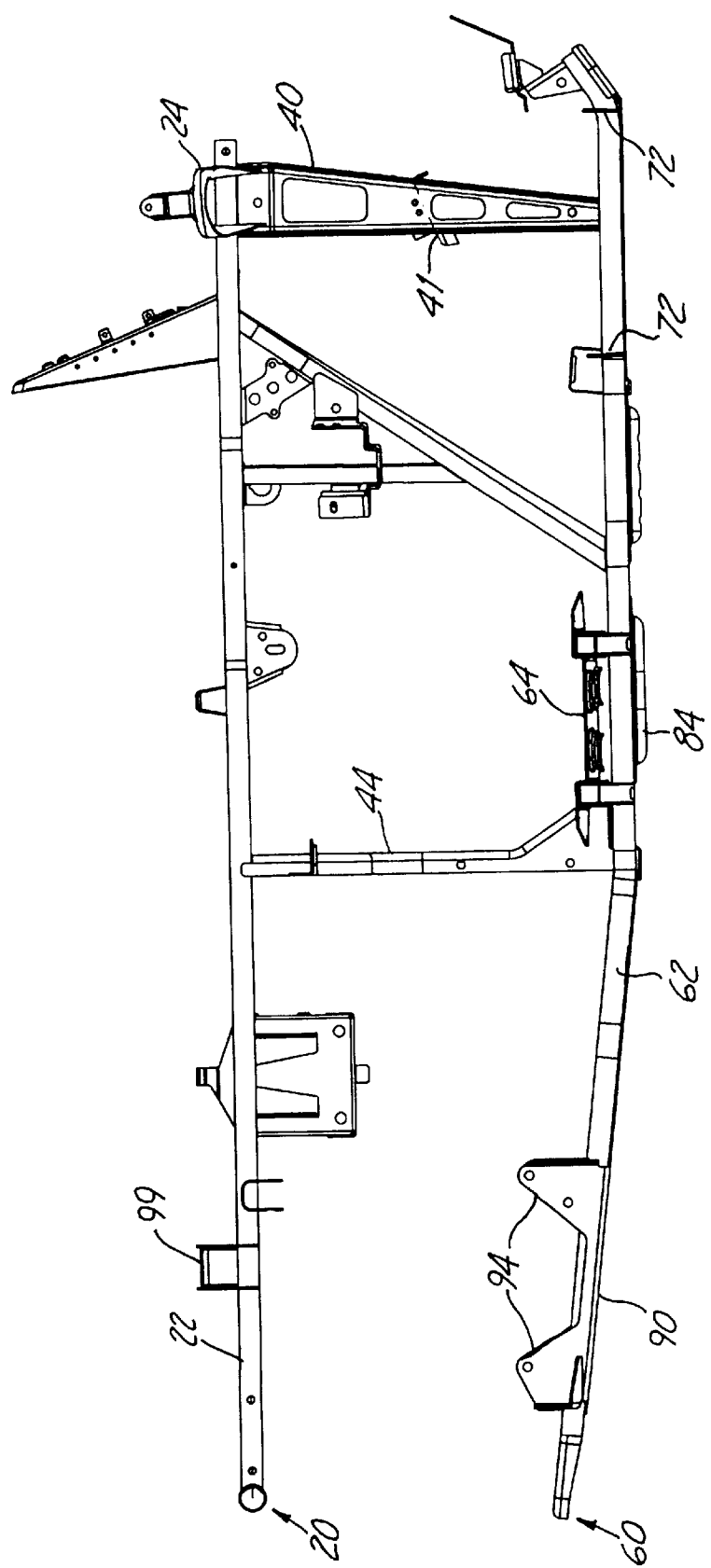
FIG. 5 is a right side view of the all terrain vehicle frame of FIG. 1.
Figure 6:
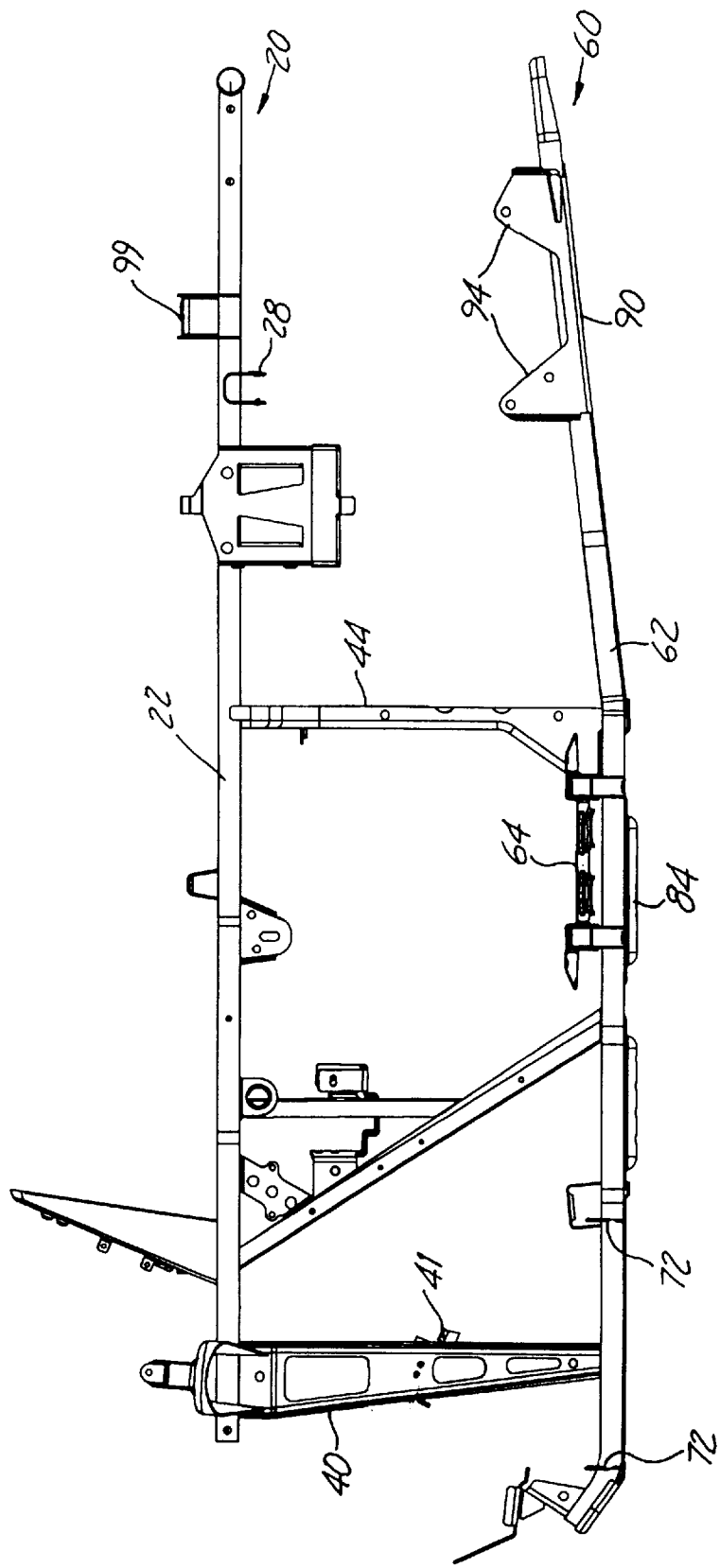
FIG. 6 is a left side view of the all terrain vehicle frame of FIG. 1.
Figure 13:
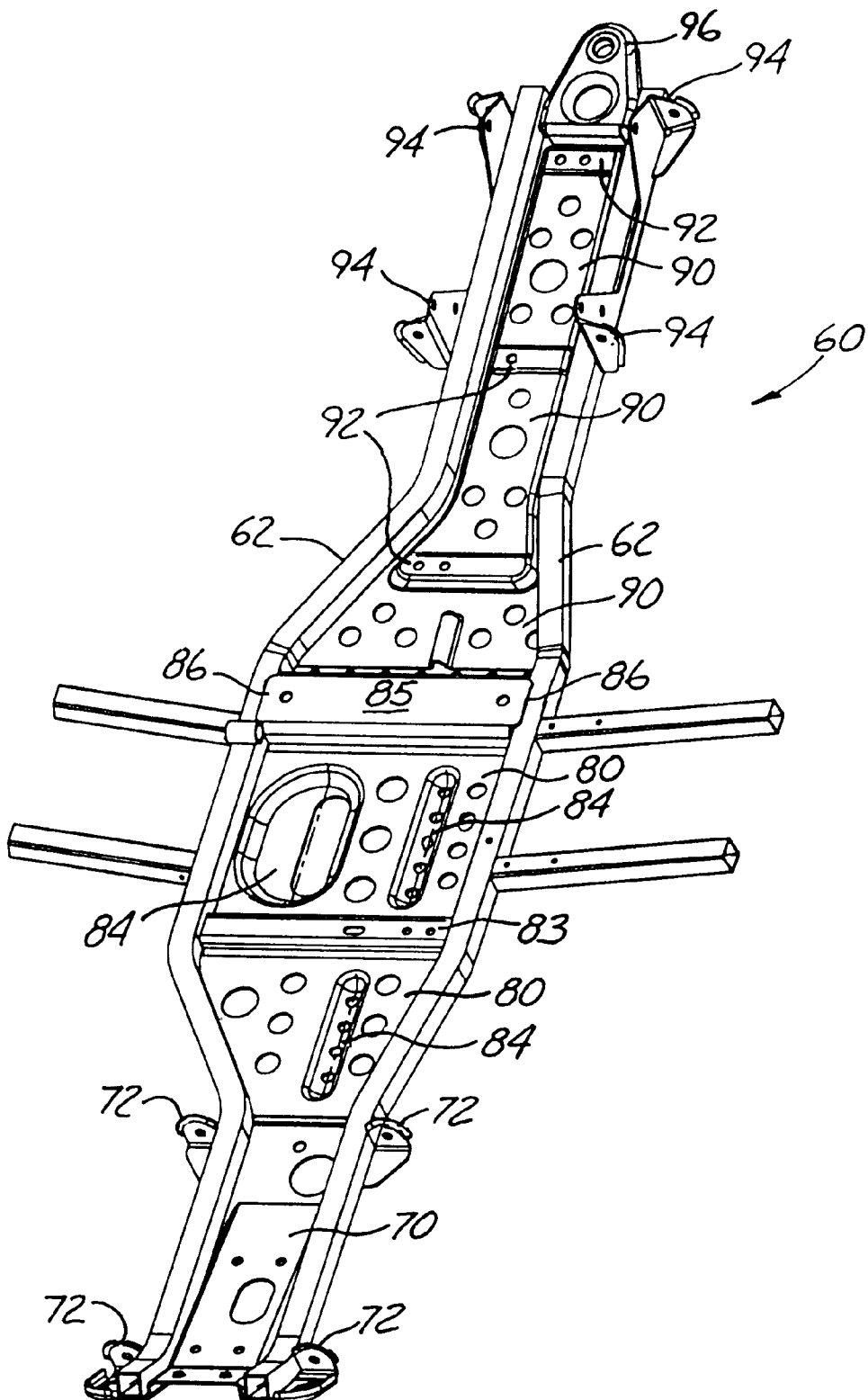
FIG. 13 is a front, top, left side perspective view of the bottom frame portion of a frame of the invention.
Figure 14:
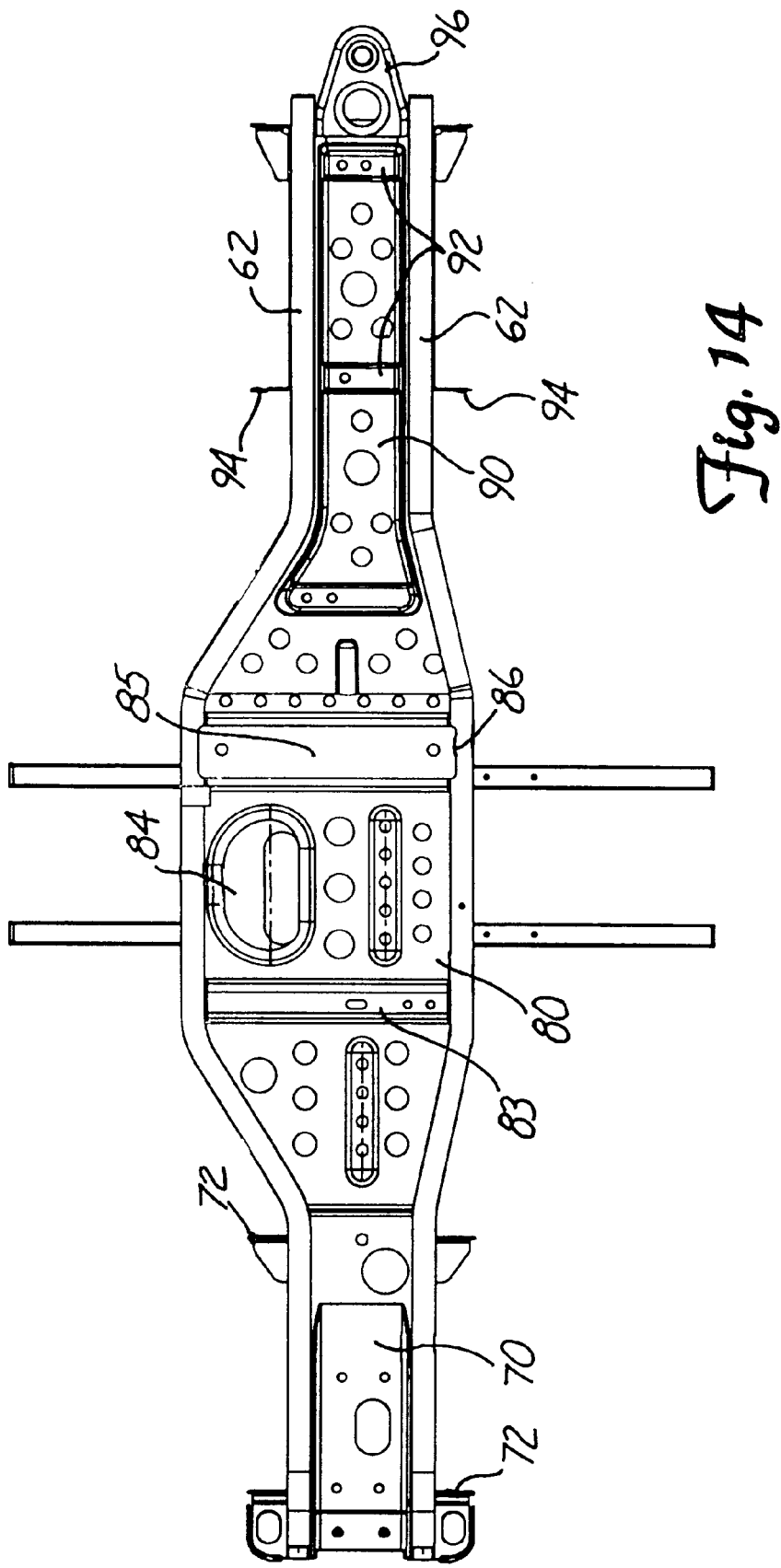
FIG. 14 is a top plan view of the bottom frame portion depicted in FIG. 13.
Figure 15:
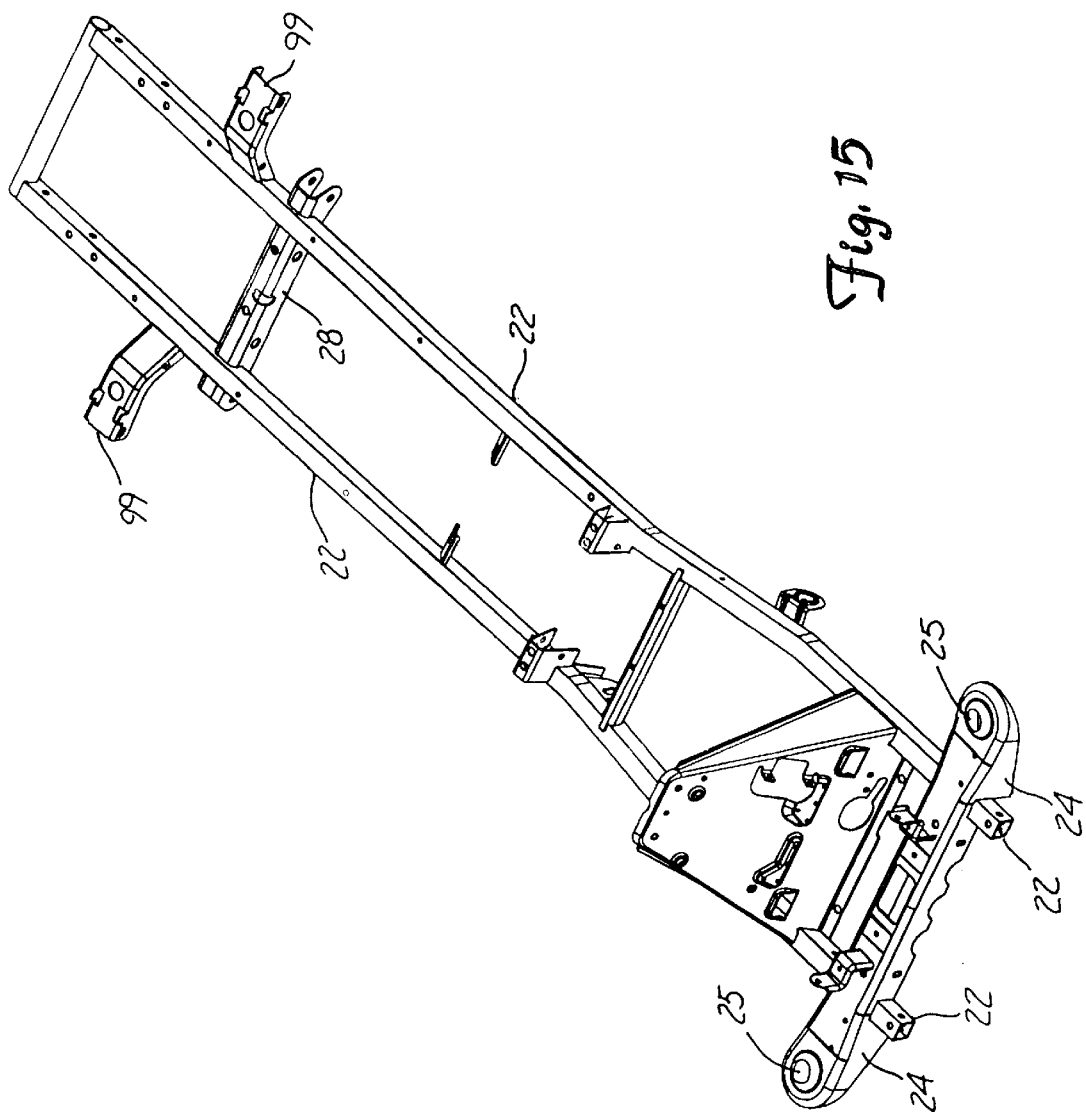
FIG. 15 is a front, top, left side perspective view of a top frame portion of a frame of the invention.
Figure 16:
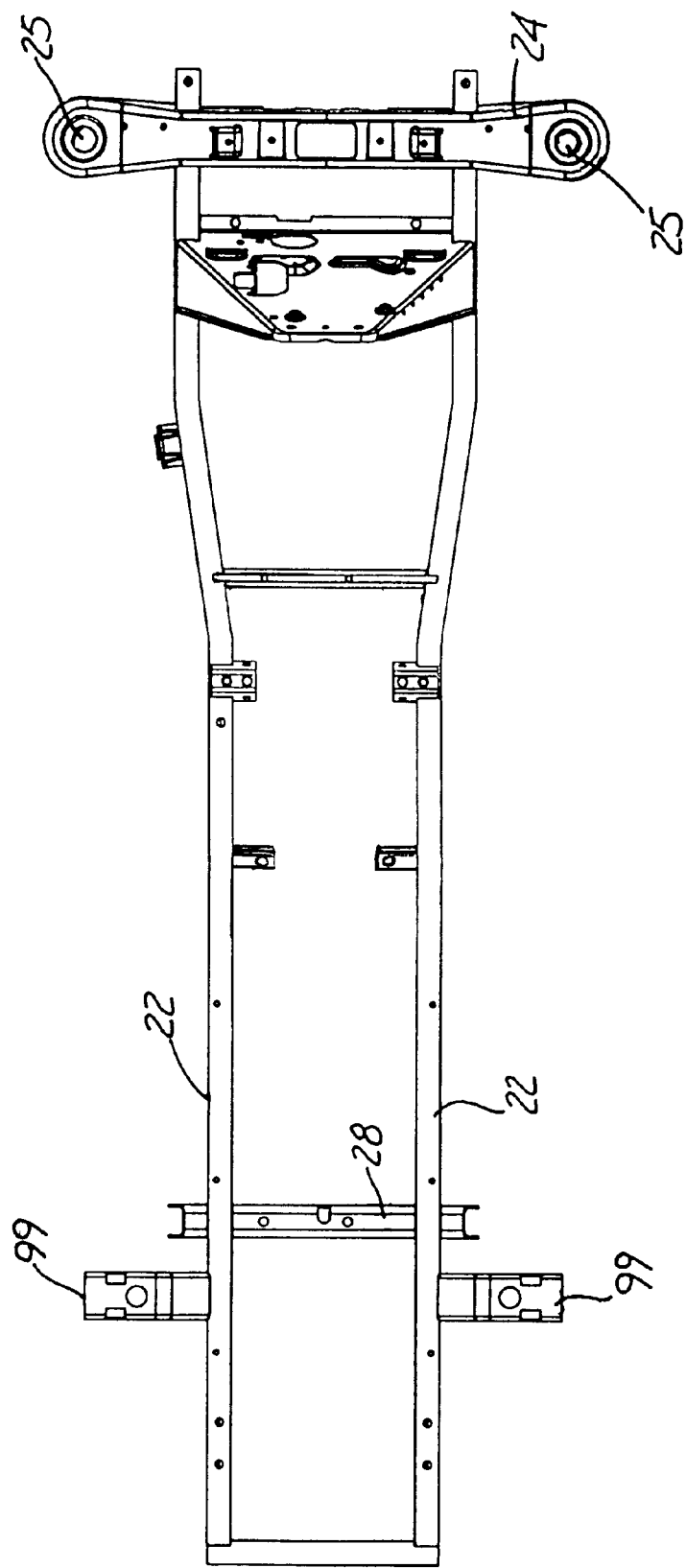
FIG. 16 is a top plan view of the top frame portion depicted in FIG. 15.

FIGS. 1–3 depict perspectives views of a preferred embodiment of a frame of the invention which is precision assembled to provide a skeleton on which the various ATV systems and components may be mounted. FIGS. 4–9 are orthogonal views of the frame of FIGS. 1–3, from which additional features can be viewed in better detail. The frame includes a bottom frame portion 60 (depicted in FIGS. 13–14), and a top frame portion 20 (depicted in FIGS. 15–16) supported above the bottom frame 60 portion by a plurality of structural support members.

The bottom frame portion 60 includes a bottom plate which may be assembled from two or more individual plates. In the preferred embodiment shown in the drawings, the bottom plate is assembled from three separate metal plates, a front plate 70, a middle plate 80 and a rear plate 90. Each of these plates is precision stamped from sheet metal (or fabricated from other suitably strong materials) to the desired size and shape, and each preferably contains precision located mounting holes to which vehicle components and systems may be mounted. The plates also preferably are provided with one or more precision located positioning holes which are used in combination with manufacturing assembly jigs (as described below) to properly position the plates with respect to one another. Each of the plates desirably includes ribs, channels, or other topographical details to provide some rigidity to the plates.

By design, ATV frames are relatively narrow in comparison to other types of four-wheeled vehicles. Like a two-wheeled motorcycle, the frame needs to be relatively narrow, since it is intended to be straddled by the rider. Unlike a motorcycle, however, the ATV has four (and sometimes six) wheels—i.e., a pair of front wheels and at least a pair of rear wheels, each member of a pair being spaced laterally from one another so that the resultant vehicle is up to four feet wide. In one preferred embodiment, the "track width" (i.e., measured from the center of one tire tread to the center of the other tire tread) is about 37"; since the tires used on this vehicle are about 10" wide, the total outside tire to tire width is about 47". This relative narrowness of the frame in comparison to the width of the wheel stance makes it difficult to provide the necessary structural and torsional strength required of a four wheeled ATV frame without utilizing the prior art welded tube type frame.

A frame of the invention is able to achieve the desired structural strength in the bottom frame portion 60 by utilizing, with the stamped plates, a pair of elongated reinforcing members 62 oriented generally horizontally and generally parallel to one another along the length of the vehicle frame. Unlike the tubular frames of conventional ATV's, which must be cut, bent and welded together with a high degree of precision, the elongated reinforcing members 62 of the invention need only be cut and bent within relatively broad tolerances. The alignment and spacing of vehicle components and systems is not determined by the precision with which these reinforcing members 62 are fabricated. Rather, such spacing and alignment is determined by the precision fabricated plates 70, 80 and 90, which are quite easily stamped into the desired sizes and shapes with repeatable precision. Thus, when the plates 70, 80 and 90 are properly positioned precisely with respect to one another (which can easily and repeatably be done by use of manufacturing jigs or the like), the reinforcing members 62 may be placed on the plates and welded to them without worrying excessively about tight tolerances.

It will be understood that the configuration of the various plates and reinforcing members may be varied substantially to meet the requirements of a particular vehicle. Features of the ATV depicted in the drawings, however, will be described in some detail to illustrate the concepts and advantages embodied in the invention.

Figure 7:
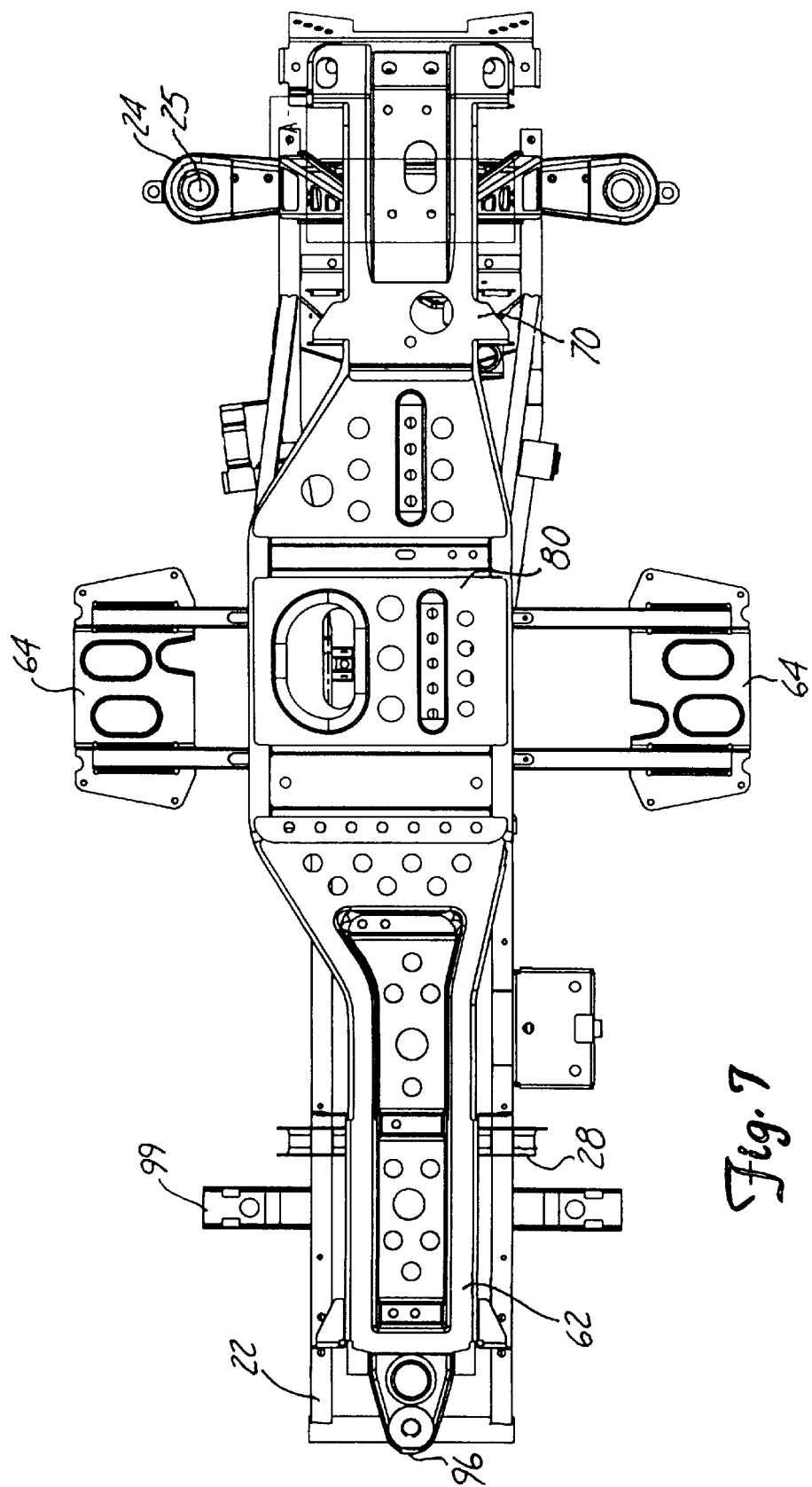
FIG. 7 is a bottom view of the all terrain vehicle frame of FIG. 1.
Figure 8:
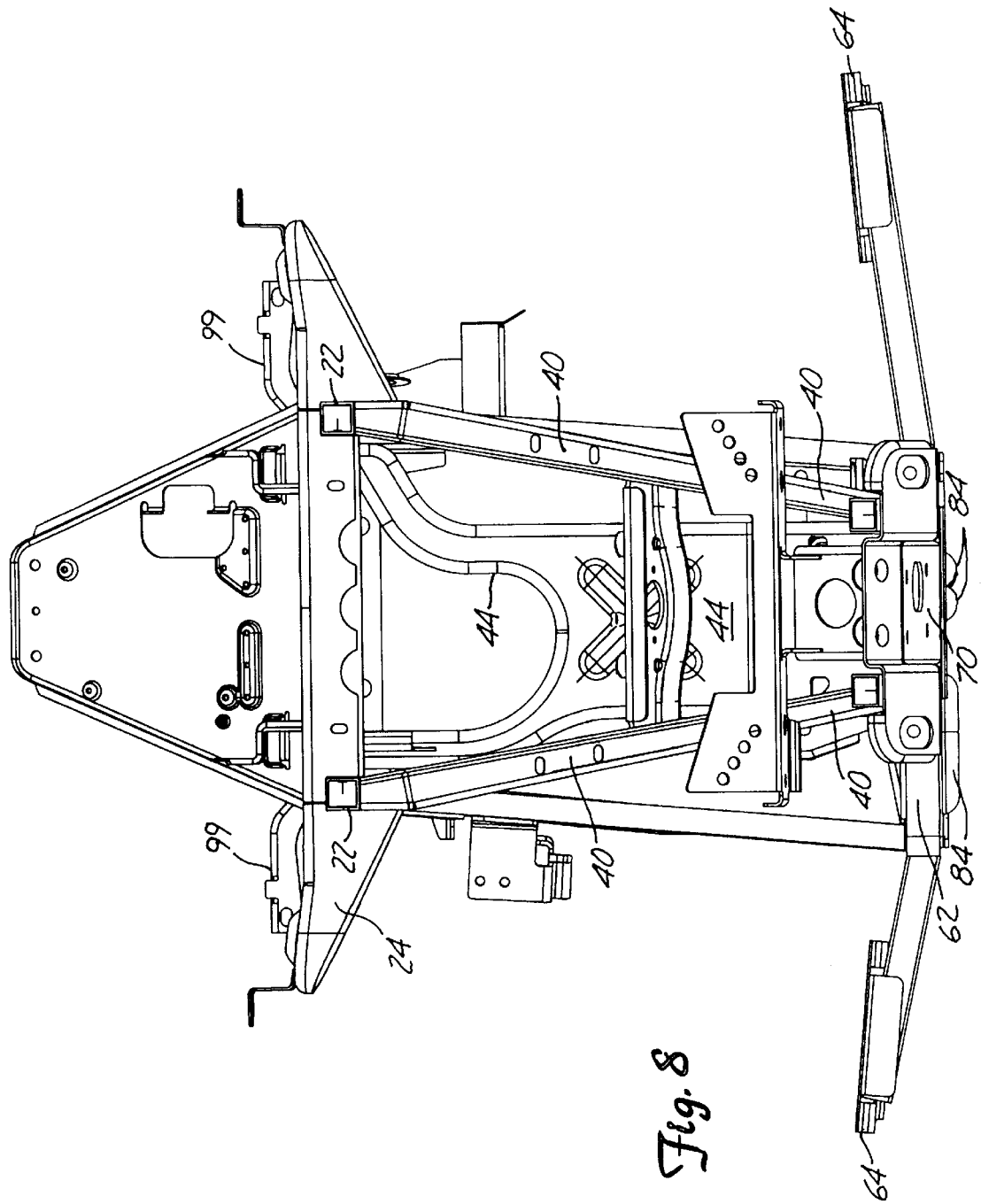
FIG. 8 is a front elevational view of the all terrain vehicle frame of FIG. 1.
Figure 9:
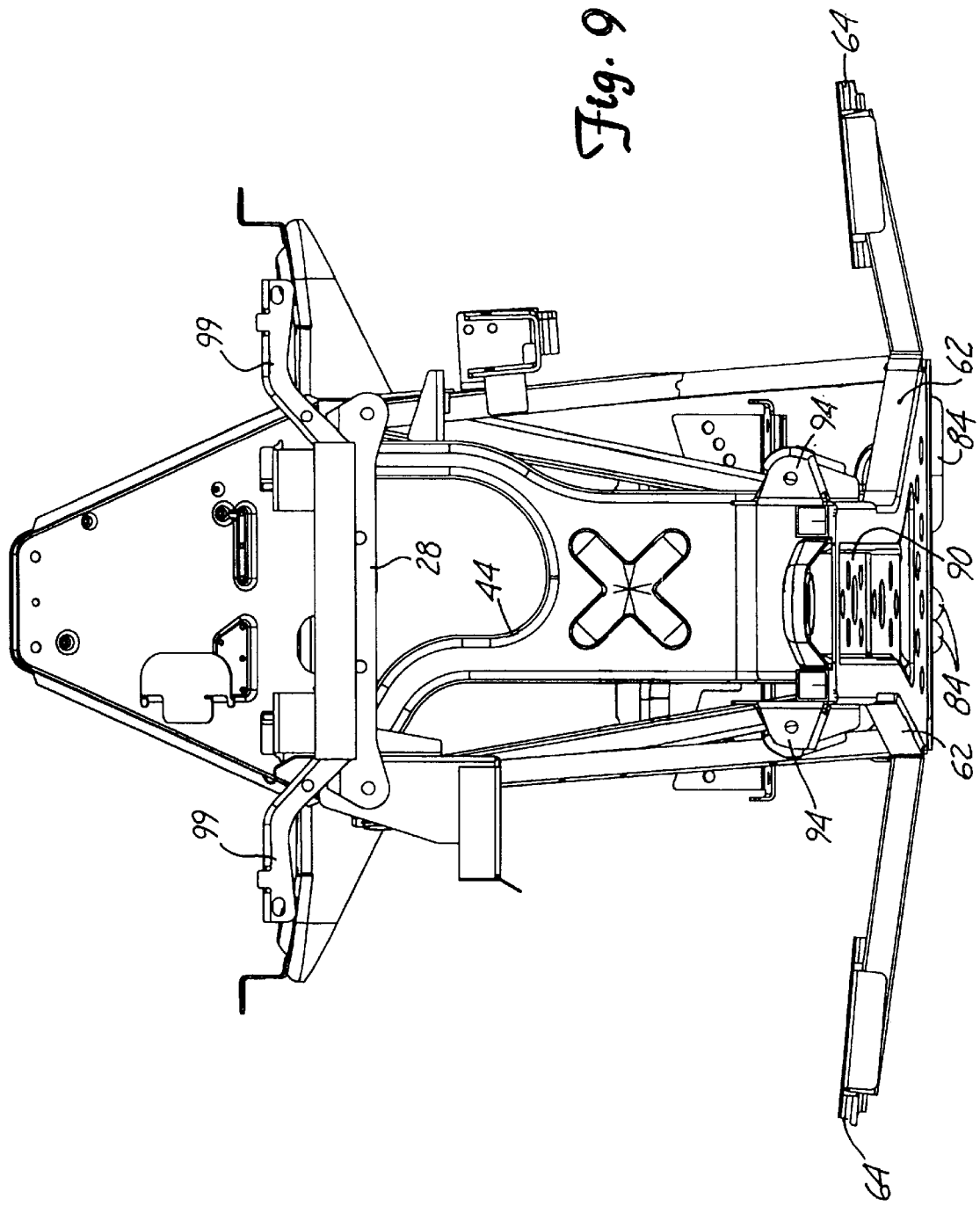
FIG. 9 is a rear elevational view of the all terrain vehicle frame of FIG. 1.

The front plate 70 of the bottom frame portion 60 is bent upwardly near its front end, and at least the front portion of this plate includes an upwardly formed central channel (visible in FIGS. 7–8, the channel extending from the front toward the back). These compound bends in the front plate 70 give the sheet metal plate a degree of rigidity. The plate includes two pairs of upwardly extending ears 72, one pair on each side. These ears 72 in turn contain precision located mounting holes to which portions of the front wheel suspension arms may be pivotally mounted. The ears 72 also provide an outer limit against which the elongated reinforcing members 62 are placed during assembly of the bottom frame 60. Notice that the precision stamped plate 70 provides the point of location against which the side of the reinforcing member 62 is placed, in contrast to the prior art where just the opposite is true—i.e., in prior art frames, the structural tube of the frames (which is difficult to consistently fabricate to strict tolerances) provides the point of location for a bracket to which the wheel suspension and other components are attached. Thus, inaccuracies in the fabrication of prior art tubular frames translate directly to mislocation of vehicle systems and components, whereas inaccuracies in the fabrication of the reinforcing members 62 of the invention have substantially no adverse effect on the location or orientation of vehicle systems and components. Other vehicle components desirably located near the front of the ATV may similarly be mounted to other precision located holes in the front plate 70, such as the front transmission 74 (see FIG. 11), a radiator, and the like.

The middle plate 80 of the bottom frame 60 has a front edge which nests against a complimentary rear lip 76 of the front plate 70, the two plates overlapping sufficiently to allow them to be welded to one another (though this is not strictly necessary since each plate, once positioned, can be secured to the reinforcing members 62). Each of the plates includes precision located positioning holes which correspond to pins on a manufacturing jig used during assembly of the frame to accurately align and position the plates with respect to one another prior to welding the various parts together. As with the front plate 70, the middle plate 80 includes topographical details to provide rigidity. Such details include an intermediate upwardly extending transverse channel 83, elongated dimples 84, and an upwardly extending transverse channel 85 located near the back end of this plate 80. The lateral edges of the top surface of this channel 85 include outwardly extending tabs 86 which rest on the top of the elongated reinforcing members 62. The lateral edges of the vertical portions of both channels 83 and 85 abut the sides of the elongated reinforcing members 62. Thus, these portions of the middle plate provide surfaces against which the elongated reinforcing members 62 may be aligned and secured.

Figure 10:
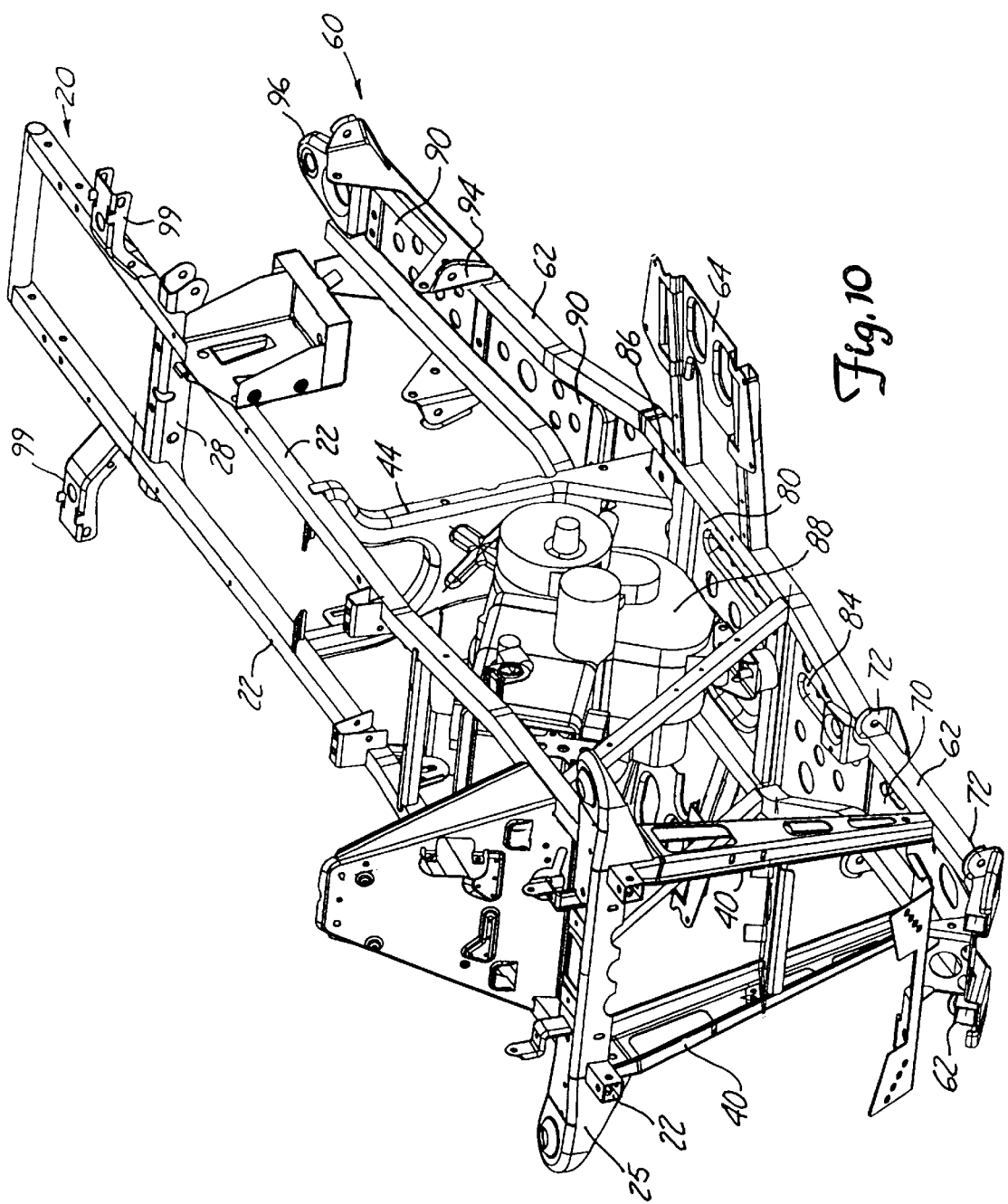
FIG. 10 is a front, top, left side perspective view similar to FIG. 2, but showing the frame with an engine mounted in the frame.
Figure 11:
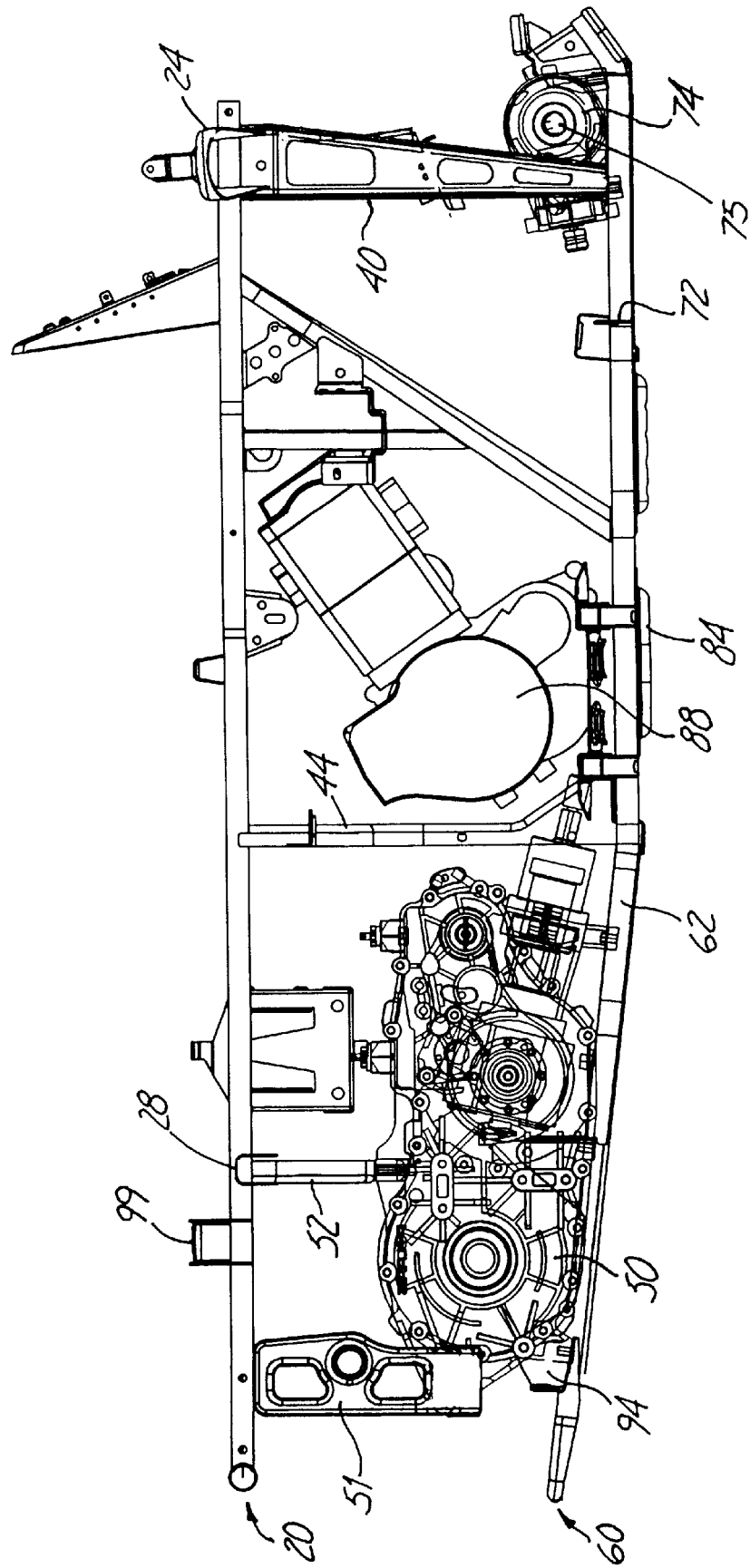
FIG. 11 is a right side elevational view similar to FIG. 5 but showing the frame with an engine and front and rear transmissions mounted in the frame.

The middle plate 80, like the front plate 70, includes precision located mounting holes for accurate positioning and mounting of additional vehicle components. As shown in FIGS. 10–11, the vehicle engine 88 may be mounted to the middle plate 80, along with other vehicle components or systems desirably located in the middle section of the vehicle.

Figure 12:
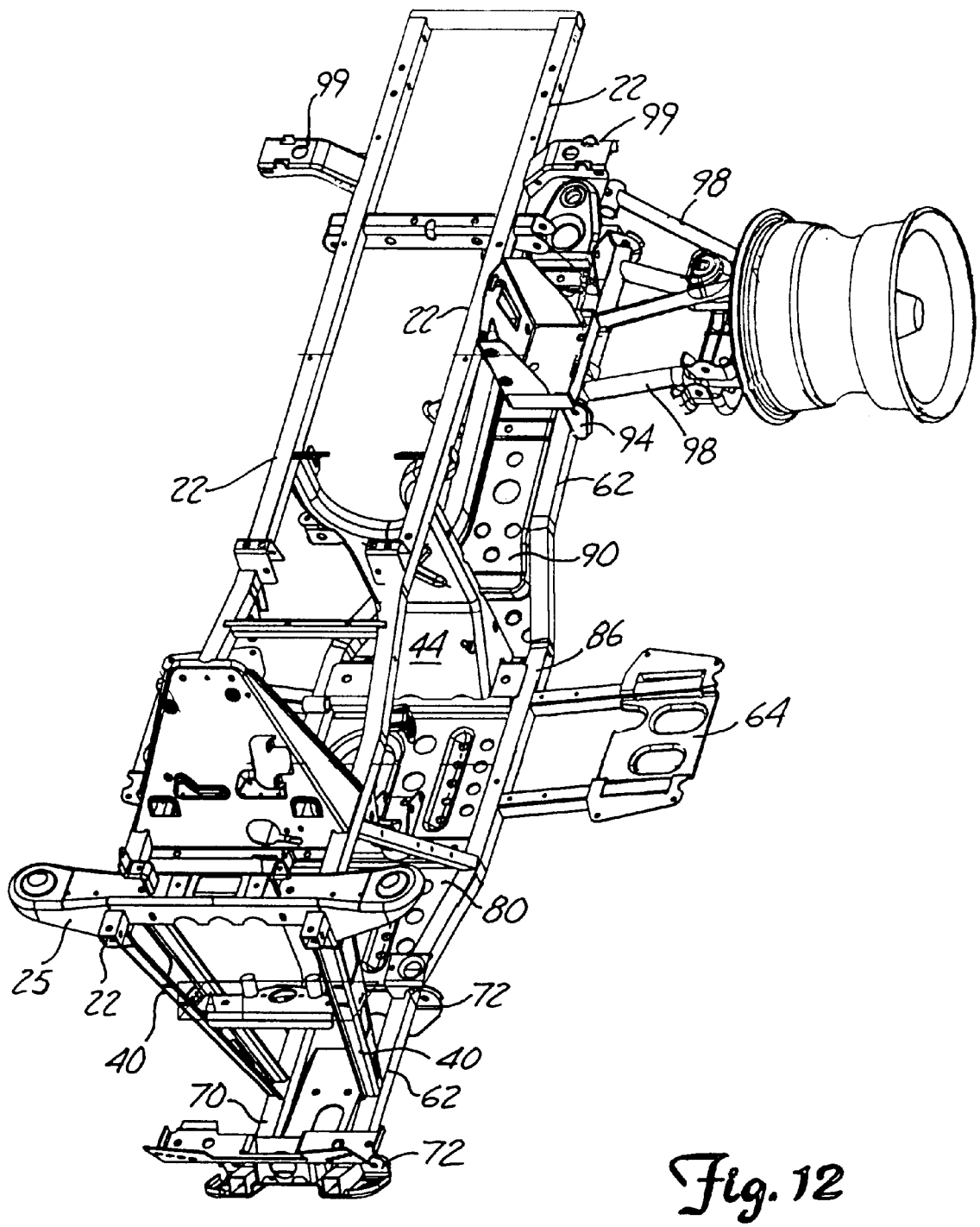
FIG. 12 is a front, top, left side perspective view similar to FIG. 3 showing the frame with the left rear wheel and suspension mounted to the frame.

The rear plate 90 has a front edge that overlaps with the rear edge of the middle plate 80, permitting these two plates to be secured to one another. Like the middle plate 80, the rear plate includes upwardly extending transverse channels 92 to provide reinforcing topographical detail. The rear plate 90 includes upwardly and outwardly extending mounting tabs 94 to which the rear wheel suspension arms may be mounted (see FIG. 12). These tabs 94 also assist in positioning the elongated reinforcing members 62 during assembly. A rear trailer hitch 96 may be secured to the rear end portions of the two elongated reinforcing members 62.

Notice that the length of the reinforcing members 62 is not critical—i.e., the length could be even an inch too long without having any effect on the location of any vehicle components. Similarly, the positioning of the bowed-out section near the middle of the reinforcing members 62 is not critical, since no vehicle components are positioned based on the location of that bowed-out section. Moreover, if during fabrication of a reinforcing member 62 the lateral bends of the reinforcing member 62 are not perfectly executed, resulting in a component that is not quite straight (e.g., the front portion is angled outwardly slightly with respect to the back portion), this "error" is automatically corrected when the member 62 is assembled to the plates—the various upwardly extending portions of the plates (which are held on jigs during assembly) will force the member 62 into proper, acceptable alignment.

The top frame portion 20 similarly preferably contains a pair of elongated reinforcing members 22. At least a portion of the top frame portion 20 is sufficiently narrow to be straddled by a rider sitting on the seat of the ATV. As with the bottom frame reinforcing members 62, preferably the spacing of the top reinforcing members 22 with respect to one another is determined, at least in part, by structure formed by one or more precision sheet metal stampings.

In the preferred embodiment illustrated in the drawings, the top frame portion 20 includes a front sheet metal stamped bracket 24 having a pair of downwardly extending notches into which the elongated reinforcing members 22 are received to properly space them laterally with respect to each other. This front bracket 24 also includes precision located holes for mounting vehicle components, including holes 25 for mounting the upper ends of the shock absorbers for the front wheel suspensions. Another sheet metal stamped bracket 28 is provided in the rear portion of the top frame 20 for properly spacing the rear portions of the elongated reinforcing members 22 with respect to each other; this bracket 28 also provides mounting holes for mounting the upper ends of brackets 52 which attach to the rear transmission. Other intermediate brackets may also be utilized, as desired, to mount other vehicle components and to further reinforce the frame, such as brackets 99 to which rear wheel suspension arms 98 may be attached.

Preferably the spacing of the top frame portion 20 with respect to the bottom frame portion 60 is determined, at least in part, by one or more support members formed by precision sheet metal stamping, again providing similar advantages of consistent precision alignment of mounting points on the frame with respect to one another. In the preferred embodiment illustrated, a pair of front support members 40 are precision stamped from sheet metal. They provides accurate alignment and positioning of the front ends of the top and bottom frame portions 20 and 60. These generally vertically oriented support members 40 also provide additional mounting holes for additional vehicle systems and components, such as a cross bracket 41 to which portions of the steering system may be secured.

An intermediate support member 44 properly positions and supports the middle section of the top frame portion 20 with respect to the bottom frame portion 60. This intermediate support member 44 includes mounting points 45 to which the engine may be secured, and includes an upper generally wish-bone shaped section providing an opening through which, e.g., air ducts may pass.

As is illustrated in FIG. 11, a portion of the rear transmission 50 forms a part of a rear support for properly positioning and supporting the rear section of the top frame portion 20 with respect to the bottom frame portion 60. A pair of stamped brackets 51 (one on each side) extends downwardly from the top frame portion 20 and attaches to an upper part of the rear transmission 50 near its back end. Another pair of brackets 52 (one on each side) extend downwardly to an intermediate portion of the transmission 50 from opposite ends of the stamped bracket 28 of the upper frame portion 20. A lower part of the rear transmission 50 is secured to the bottom frame portion 60, e.g. by attachment to the tabs 94 of the rear plate 90. In this way the rear transmission both supports the rear portion of the upper frame 20 and also serves to accurately locate the position of the upper frame, since the relative locations of mounting holes on the transmission 50 are easily carefully controlled during manufacture of the transmission 50.

Figure 17:
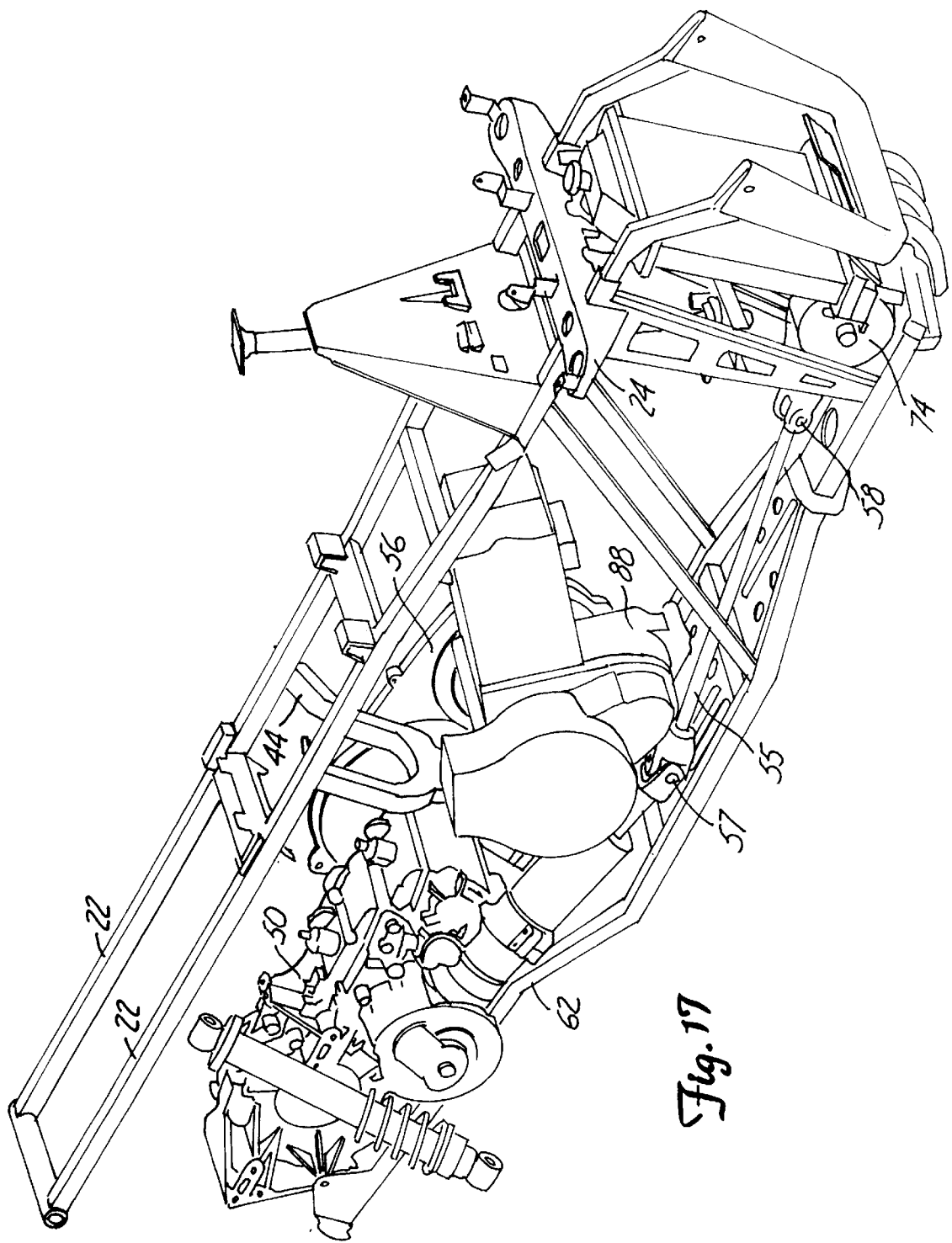
FIG. 17 is a front, top, right side perspective view showing the frame with certain vehicle components mounted in it.

In a two wheel drive ATV, it is important that the transmission 50 and engine 88 be mounted in the proper spacial relationship to one another. This is particularly the case with the ATV depicted in the drawings, which includes a belt driven continuously variable split-sheave type clutch transmission 56 (see FIG. 17) which connects the engine 88 to the rear transmission 50 (this type of split sheave transmission is provided on Polaris ATV's, and often referred to as a CVT—continuously variable transmission). As described above, however, the mounting of the engine 88 and rear transmission 50 to the precision stamped plates 80 and 90 assures accurate placement and orientation of these components. Moreover, this vehicle can be easily converted to a four wheel drive ATV by adding a drive shaft 55 and a front transmission (or gearbox) 74 connected to the front axle 75 (see FIGS. 11 and 17). As can be seen from FIGS. 11 and 17, in the ATV depicted in the drawings the drive shaft 55 must extend from the rear transmission 50 to the front transmission 74 by passing under the engine 88. A pair of universal joints 57 and 58 are utilized to accommodate this geometry. As can be seen from FIG. 17, however, the location of the rear universal joint 57 with respect to the engine 88 is quite important, since there is not a great excess of clearance. The distance from the rear transmission 50 to the front transmission 74 is also important to make sure the splines engage properly at the front transmission. Accordingly, proper positioning of the various components with respect to one another can be assured utilizing the frame of the invention.

In addition to providing structural strength and accurate location of vehicle components and systems with respect to one another, the plates 70, 80 and 90 of the bottom frame portion 60 also provide valuable protection to critical vehicle components. Since ATV's are intended for off-road use, the bottom of the vehicle may be exposed to sometimes rugged terrain. The plates act as effective shields for the transmission and engine, as well as other vehicle systems. If the vehicle should, e.g., run over a tree branch that strikes the bottom of the vehicle, the plates will absorb the impact without harming mechanical components of the vehicle. In fact, once the entire vehicle has been accurately assembled, the plates (due at least in part to the topographical detail with which they are formed) can even suffer some physical deformation without adversely affecting the performance of the vehicle. While prior art ATV's often utilize what are known as "skid plates" to protect the bottom of the vehicle, these skid plates typically are an extra component which must be mounted to the vehicle frame after the frame itself has been constructed, thus adding additional parts and assembly steps. In contrast, the frame of the present invention utilizes the plates as integral components of the frame, providing precision mounting and alignment of vehicle components, permitting the plates to simultaneously perform their protective "skid plate" function, thus reducing the number of components of the vehicle.

Component reduction is an important advantage of the invention. Applicant has found that frame depicted in the drawings can effectively be constructed with less than 40 parts (in one embodiment, merely 38 parts), replacing a prior art conventional welded tube frame having as many as 80 to 120 parts. Reduction of the number of parts thus simplifies assembly of the ATV frame.

The preferred ATV frame of the invention depicted in the drawings is assembled as follows. The three bottom plates are laid out on a manufacturing jig in the proper spatial relationship to one another. Each of the plates includes at least one, and preferably at least two holes which have been stamped into the plate in a precise location. These holes are then placed over complementary pins precisely located on the manufacturing jig, yielding easy, consistently accurate alignment of the plates.

The reinforcing members are then placed on the plates in the proper position—as described above, since no location-sensitive components depend on the precise location of the reinforcing members, their relative location is less critical. Since the plates can be formed with tabs, ribs, lips and edges that help define the proper location of the reinforcing members, however, many inaccuracies in the fabrication of the reinforcing members (e.g., if not bent or formed to the proper angle) are automatically corrected when the reinforcing members are fit into their spots on the plates. Once the plates and reinforcing members (and any other incidental bottom frame components, such as the square tubes for the foot rests 64, and the rear hitch) are properly aligned on the manufacturing jig, the parts may be welded (or otherwise secured) to one another, and then removed from the jig.

Independently, the top frame portion may be similarly assembled on a suitable jig which properly aligns the various components. The top frame portion and bottom frame portion may then be brought together in a third jig which aligns them with respect to each other as at least some of the structural support members are positioned and then welded (or otherwise secured) to the top and bottom frame portions. The frame may then be removed from this jig and passed down the manufacturing assembly line where it will gather the remaining vehicle components and systems found in the completed ATV.

While a preferred embodiment of the present invention has been described, it should be understood that various changes, adaptations and modifications may be made therein without departing from the spirit of the invention and the scope of the appended claims.

What is claimed is:

1. An all terrain vehicle frame, comprising:
   a bottom frame portion including one or more bottom plates, each such plate being a sheet metal stamping and at least some of such plates having a plurality of precision located mounting holes for mounting vehicle drive train components thereto;
   a top frame portion for supporting a seat, at least that portion of the top frame portion straddled by a rider sitting on the seat being sufficiently narrow to be straddled by such rider sitting on the seat; and
   a plurality of structural support members supporting the top frame portion with respect to the bottom frame portion one of the support members comprising, at least in part, a vehicle transmission.

2. An all terrain vehicle frame, comprising:
   a bottom frame portion including one or more bottom plates, each such plate being a sheet metal stamping and at least some of such plates having a plurality of precision located mounting holes for mounting vehicle drive train components thereto;
   a top frame portion for supporting a seat, at least that portion of the top frame portion straddled by a rider sitting on the seat being sufficiently narrow to be straddled by such rider sitting on the seat; and
   a plurality of structural support members supporting the top frame portion with respect to the bottom frame portion
   the top frame portion including two or more elongated reinforcing members, the spacing of such reinforcing members with respect to one another and with respect to the bottom frame portion being determined, at least in part, by structure formed in a sheet metal stamping support member which supports, at least in part, the top frame portion with respect to the bottom frame portion.

3. An all terrain vehicle frame, comprising:
   a bottom frame portion being substantially longer than it is wide, and including a pair of elongated reinforcing members oriented generally horizontally and generally parallel to one another along the length of the bottom frame portion, and two or more bottom plates, each such plate being a sheet metal stamping secured to the elongated reinforcing members, at least some of such plates having a plurality of precision located mounting holes for mounting vehicle drive train components thereto, the bottom plates being of a length and width sufficient to shield a substantial portion of an engine mounted to the all terrain vehicle frame;

a top frame portion at least a portion of which is sufficiently narrow to be straddled by a rider sitting on a seat carried on the top frame portion, the top frame portion including a pair of elongated reinforcing members oriented generally horizontally and generally parallel to one another along the length of the top frame portion, the top frame portion further including two or more brackets stamped from sheet metal and having structure for engagement with the elongated reinforcing members of the top frame portion to space and position such reinforcing members with respect to one another;

front, rear and intermediate structural support members supporting the top frame portion with respect to the bottom frame portion, at least some of such support members being sheet metal stampings.

4. An all terrain vehicle frame, comprising:

a bottom frame portion including one or more bottom plates, each such plate being a sheet metal stamping;

a top frame portion at least a portion of which is sufficiently narrow to be straddled by a rider sitting on a seat carried on the top frame portion;

a plurality of structural support members supporting the top frame portion with respect to the bottom frame portion, at least one of the structural support members being a vehicle transmission.

* * * * *